United States Patent [19]

Takahashi et al.

[11] Patent Number: 5,028,996
[45] Date of Patent: Jul. 2, 1991

[54] PICTURE CODING METHOD

[75] Inventors: Toshiya Takahashi; Toshihide Akiyama, both of Takatsuki, Japan

[73] Assignee: Matsushita Electric Industrial Co., Ltd., Osaka, Japan

[21] Appl. No.: 541,734

[22] Filed: Jun. 21, 1990

[30] Foreign Application Priority Data

Jun. 26, 1989 [JP] Japan .................................. 1-163050
Nov. 21, 1989 [JP] Japan .................................. 1-302898

[51] Int. Cl.⁵ ............................................. H04N 7/12
[52] U.S. Cl. .................................. 358/105; 358/133; 358/136
[58] Field of Search ................ 358/105, 133, 135, 136

[56] References Cited

U.S. PATENT DOCUMENTS

4,845,560  7/1989  Kondo et al. .................. 358/105 X
4,853,775  8/1989  Rouvrais et al. .................... 358/105

Primary Examiner—Victor R. Kostak
Attorney, Agent, or Firm—Wenderoth, Lind & Ponack

[57] ABSTRACT

Motion vectors are determined in each frame of the input image data, and optimum motion vectors characterizing the motion are extracted from the determined motion vectors, a three-dimensional block is composed in space and in time along the extracted optimum motion vectors, and the composed three-dimensional block is block-coded by orthogonal transform or the like, according to the disclosed picture coding method.

16 Claims, 9 Drawing Sheets

$$\begin{array}{l} mvh(1,1,t)\ mvh(2,1,t)\cdots mvh(5,1,t) \\ mvh(1,2,t)\ mvh(2,2,t)\cdots mvh(5,2,t) \\ mvh(1,3,t)\ mvh(2,3,t)\cdots mvh(5,3,t) \\ mvh(1,4,t)\ mvh(2,4,t)\cdots mvh(5,4,t) \\ mvh(1,5,t)\ mvh(2,5,t)\cdots mvh(5,5,t) \end{array} = \begin{array}{rrrrr} -3 & -2 & 0 & 1 & 3 \\ -3 & -2 & 0 & 0 & 3 \\ -1 & -2 & 0 & 1 & 2 \\ -3 & -2 & 0 & 1 & 3 \\ -3 & -3 & 0 & 1 & 3 \end{array}$$

FIG. 4(f)

$$\begin{array}{l} mvh'(1,1,t)\ mvh'(2,1,t)\cdots mvh'(5,1,t) \\ mvh'(1,2,t)\ mvh'(2,2,t)\cdots mvh'(5,2,t) \\ mvh'(1,3,t)\ mvh'(2,3,t)\cdots mvh'(5,3,t) \\ mvh'(1,4,t)\ mvh'(2,4,t)\cdots mvh'(5,4,t) \\ mvh'(1,5,t)\ mvh'(2,5,t)\cdots mvh'(5,5,t) \end{array} = \begin{array}{rrrrr} -3 & -2 & 0 & 2 & 3 \\ -3 & -2 & 0 & 2 & 3 \\ -3 & -2 & 0 & 2 & 3 \\ -3 & -2 & 0 & 2 & 3 \\ -3 & -3 & 0 & 2 & 3 \end{array}$$

PICTURE CODING METHOD

BACKGROUND OF THE INVENTION

1. Field of the Invention

The present invention relates to a picture coding method for coding picture signals at high efficiency.

2. Description of the Prior Art

The transmission speed of digitized picture signals has exceeded 100 Mbps, and it is difficult to transmit such signals directly by using the existing communication lines from the viewpoints of the transmission capacity and transmission cost. The picture coding is a technique for removing the redundancy of picture signals and reducing the transmission speed, and various methods and apparatuses had been proposed in the past. A representative example of orthogonal transform coding is described below.

Figure 6A:
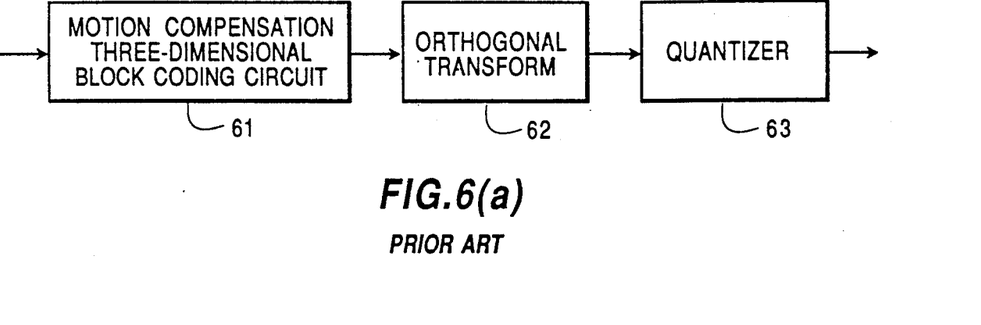

FIG. 6(a) is an example of a conventional block coding method, showing a block diagram of a three-dimensional orthogonal transform coding apparatus, in which numeral 61 is a three-dimensional blocking circuit, 62 is a orthogonal transform circuit, and 63 is a quantizer.

Figure 6B:
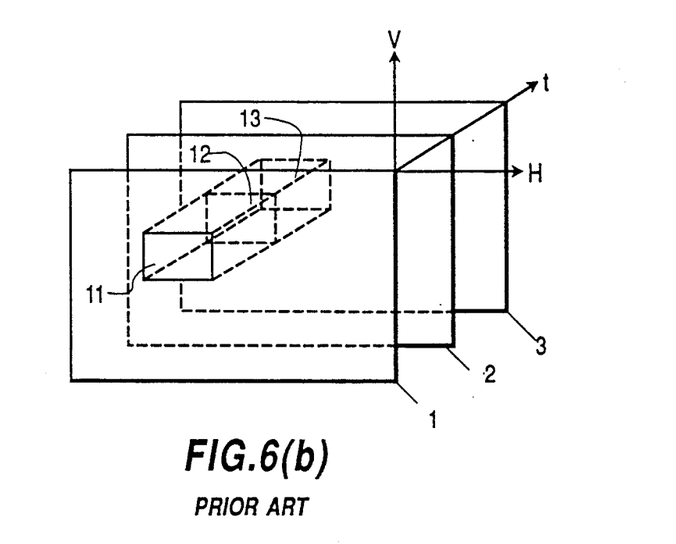
Figure 6C:
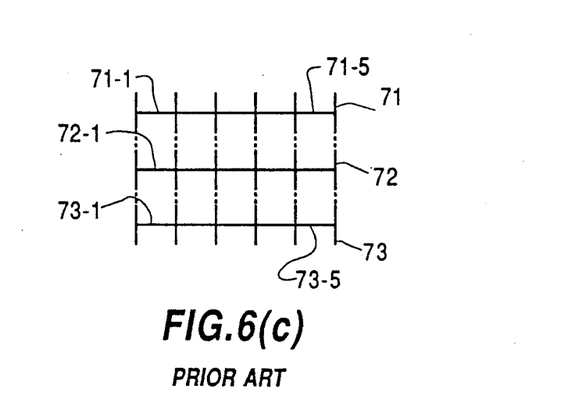

FIGS. 6(b), (c) are explanatory diagrams of conventional three-dimensional block construction. In FIG. 6(b), numeral 1 denotes image data of a first frame, 2 is image data of a second frame, 3 is image data of a third frame, 11 is a two-dimensional block in the first frame, 12 is a two-dimensional block in the second frame, and 13 is a two-deminsional block in the third frame. In FIG. 6(c), the image data of each frame is drawn as two-dimensional plan view in the horizontal and time directions, and the frame in the time direction is illustrated as an example of up to three frames. In FIG. 6(c), numeral 71 denotes part of image data of the first frame, 72 is part of image data of the second frame, and 73 is part of image data of the third frame.

In thus composed three-dimensional orthogonal transform coding apparatus, the operation is described below.

In FIG. 6, the image input data s(h,v,t) (here h: picture element index in the horizontal direction, $1 \leq h \leq M$, v: picture element index in the vertical direction, $1 \leq v \leq N$, t: picture element index in the time direction, $1 \leq t \leq T$) entering the three-dimensional blocking circuit 61 is first divided into mXn two-dimensional blocks 71-1 in the first frame, and into 72-1 in the second frame 72, and so forth, and thus at the same two-dimensional position with frame, the two-dimensional blocks up to T-th frame are summed up thereafter in the time direction to be composed into mXnXT three-dimensional blocks.

The three-dimensional blocks are orthogonally transformed in the orthogonal transform circuit 62. The transform coefficient which is the output of the orthogonal transform circuit 62 is quantized in the quantizer 63 so that the quantizing bit allotment may be more in the coefficient of low sequence and be less in the coefficient of high sequence, and the quantized transform coefficient is later delivered as coding output. Generally, a natural picture is high in the correlation among the picture elements in the horizontal, vertical and time directions, and orthogonal transform coefficient is large in energy in low sequency and small in high sequency. Therefore, when quantizing, if small bits are assigned to the coefficient of high sequency, degradation is not obvious visually, and it is possible to compress while suppressing the picture quality degradation (for example, see chapter 12 of "Digital coding of waveform" by Jayant et al., published by Academic Press/Prentice-Hall).

In such conventional structure including three dimensions of the horizontal, vertical and time direction, in the case of a widely moving picture, the correction in the time direction is lowered and the efficiency is poor.

SUMMARY OF THE INVENTION

It is hence a primary object of the invention to present a picture coding method capable of realizing a high compression rate even in a widely moving picture in the light of the conventional problems discussed above.

To achieve the above object, the invention presents a picture coding method comprising the steps of:

dividing the input T-frame picture data s(h,v,t) (here h: picture element index in the horizontal direction, $1 \leq h \leq M$, v: picture element index in the vertical direction, $1 \leq v \leq N$, t: picture element index in the time direction, $1 \leq t \leq T$) into two-dimensional blocks sb(x,y,l) (where x: block coordinate in the horizontal direction in frame, $1 \leq x \leq M/m$, y: block coordinate in the vertical direction in frame, $1 \leq y \leq N/n$) of m(horizontal direction)Xn(vertical direction) picture elements each in the first frame, that is, s(h,v,l), obtaining the two-dimensional blocks sb(x,y,2) in the size of mXn most closely correlated with said sb(x,y,1) on the second frame s(h,v,2), and simultaneously determining the horizontal motion vector mvh(x,y,1) showing the motion quantity in the horizontal direction of said sb(x,y,2) on the basis of said sb(x,y,1) and the vertical motion vector mvv(x,y,2) showing the motion quantity in the vertical direction, calculating again the optimum motion vectors mvhr(x,y,2), mvvr(x,y,2) from the motion vectors mvh(x,y,2), mvv(x,y,2) of each block in the frame with respect to each block, adding the motion quantities mvhr(x,y,2), mvvr(x,y,2) of said motion vectors to obtain s(h+mvht(t), v+mvvt(t),t) and cutting out the two-dimensional block composed of mXn picture elements on the second frame to obtain sb'(x,y,2), determining the two-dimensional block sb(x,y,3) and motion vectors mvh(x,y,3), mvv(x,y,3) in the size of mXn most closely correlated with said sb'(x,y,2) on the third frame s(h,v,3), calculating again, in each block, the optimum motion vectors mvhr(x,y,3), mvvr(x,y,3) from the motion vectors mvh(x,y,3), mvv(x,y,3) of each block in the frame, from the motion quantity between the two-dimensional blocks sb'(x,y,2) and sb(x,y,3) obtained above, adding mvhr(x,y,3), mvvr(x,y,3) to the motion quantity of said motion vectors to obtain s(h-mvht(t), v-mvvt(t),t), and cutting out a two-dimensional block composed of mXn picture elements on the third frame to obtain sb'(x,y,3), Operating thereafter similarly up to the T-th frame s(h,v,T) to obtain a two-dimensional block sb'(x,y,t) in each frame, composing a three-dimensional block of said two-dimensional blocks sb(x,y,1), sb'(x,y,2) to sb'(x,y,T) among said T frames, and block-coding at least part of said three-dimensional block.

The invention, having such construction, is capable of keeping high the correlation in the time direction, so that a high compression ratio may be realized even in widely moving pictures.

BRIEF DESCRIPTION OF THE DRAWINGS

FIGS. 6a-6c are block diagrams of a three-dimensional orthogonal transform coding apparatus. 1 . . . image data of a first frame, 2 . . . image data of a second frame, 3 . . . image data of a third frame, 4 . . . motion vector between the first frame and second frame, 5 . . . is a motion vector between the second frame and third frame, 6 . . . three-dimensional block coding circuit for motion compensation, 7 . . . orthogonal transform circuit, 8 . . . quantizer, 11 . . . two-dimensional block in the first frame, 12 . . . two-dimensional block in the second frame, 13 . . . two-dimensional block in the third frame, 14 . . . frame memory, 15 . . . motion detection circuit, 16 . . . address generation circuit, 17 . . . CPU, 21 . . . part of image data of the first frame, 22 . . . part of image data of the second frame, 23 . . . part of image data of the third frame, 24-29,31-42 . . . motion vector, 61 . . . three-dimensional block coding circuit, 62 . . . orthogonal transform circuit, 63 . . . quantizer, 71 . . . part of image data of the first frame, 72 . . . part of image data of the second frame, 73 . . . part of image data of the third frame.

DESCRIPTION OF THE PREFERRED EMBODIMENTS

Referring now to the drawings, some of the preferred embodiments are described in detail below.

Figure 1A:
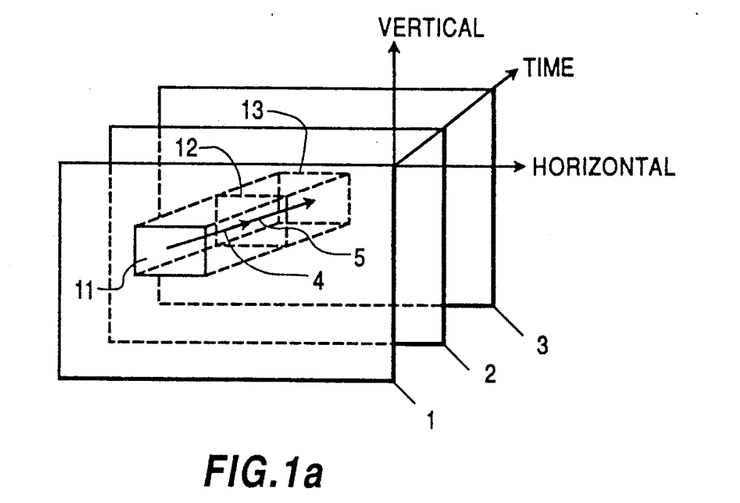
FIGS. 1a-1b are explanatory diagrams of picture coding method showing a first embodiment of the invention.
Figure 1B:
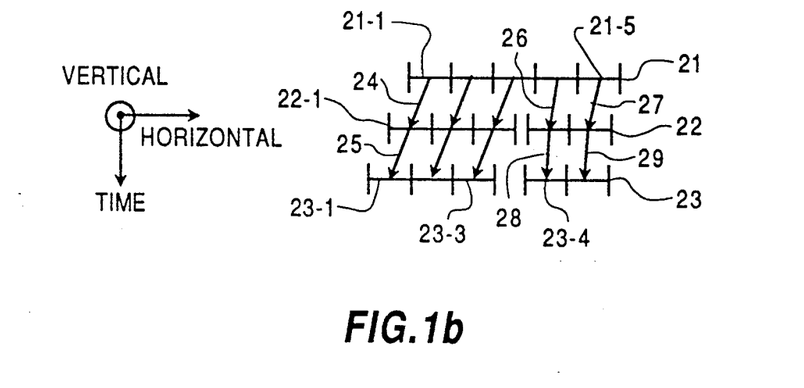
Figure 2A:
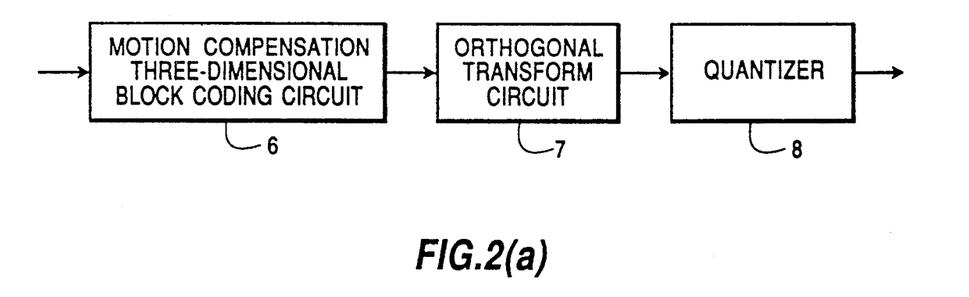
FIGS. 2a-2c are explanatory diagrams of picture coding apparatus in the first embodiment of the invention.

FIG. 1 is an explanatory diagram of a picture coding method in a first embodiment of the invention, and FIG. 2 is an explanatory diagram of a picture coding apparatus in the first embodiment. In FIG. 1(a), numeral 1 denotes image data of a first frame, 2 is image data of a second frame, 3 is image data of a third frame, 4 is a motion vector between the first frame and second frame, 5 is a motion vector between the second frame and third frame 11 is a two-dimensional block in the first frame, 12 is a two-dimensional block in the second frame, and 13 is a two-dimensional block in the third frame. FIG. 1(b) is an explanatory diagram drawing the picture data of each frame in FIG. 1(a) as a two-dimensional plan view in the horizontal and time directions, and the frames in the time direction are drawn up to three frames as an example. In this diagram, numeral 21 denotes part of image data of the first frame, 22 is part of image data of the second frame, and 23 is part of image data of the third frame.

Figure 2B:
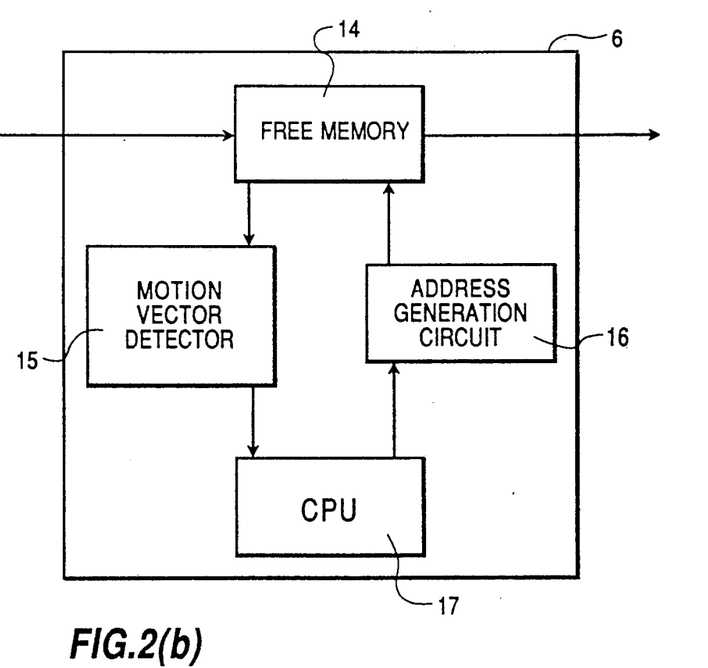

FIG. 2(a) shows an example of image coding apparatus, in which numeral 6 is a three-dimensional block coding circuit for motion compensation, 7 is an orthogonal transform circuit, and 8 is a quantizer. FIG. 2(b) is a structural diagram of the motion compensation threedimensional block coding circuit 6, which comprises a frame memory 14, a motion vector detection circuit 15, an address generation circuit 16, and a CPU 17.

The input image data is fed into the motion compensation three-dimensional block coding circuit 6, and is transformed into three-dimensional blocks in the following method. The three-dimensional block image data is orthogonally transformed, quantized and send out to the transmission line in the same manner as in the prior art.

FIG. 2(b) is a structural diagram of the motion compensation three-dimensional block coding circuit 6. The image data is written into the frame memory 14, and first the motion vector is detected by the motion vector detection circuit 15. Next, the detected motion vector is fed into the CPU, which calculates the beginning address h,v of each two-dimensional block according to the motion vector, and delivers to the address generation circuit 16. The address generation circuit 16 increases the beginning address h,v of each two-dimensional block, and generates the addresses of h to h+m, v to v+n. Therefore, as the CPU continuously generates the beginning addresses for the portion of T frames, the image data of three-dimensional blocks of mXnXT picture elements are sent out from the frame memory 14 to the orthogonal transform circuit 7. The image coding apparatus shown in FIGS. 2(a), (b) may be commonly used in all embodiments of the invention by modifying only the program of the CPU. Therefore, in the succeeding embodiments, explanations are given while referring to the flow chart of the CPU.

First referring to FIG. 1(b), the detection method of motion vectors 24, 25 is described. Of the input image data, the reference frame is supposed to be the image data 21 of the first frame, which is divided into mXn two-dimensional blocks 21-1 to 21-5. These two-dimensional blocks are expressed as sb(1,1,1) to sb(5,1,1) (where, in sb(x,y,t), x: block coordinate in the horizontal direction in frame, $1 \leq x \leq M/m$, y: block coordinate in the verticle direction in frame, $1 \leq y \leq N/n$, t: frame index, $1 \leq t \leq T$).

The two-dimensional block 21-1 on the first frame is matched in block to the second frame as well known in the general image processing technology, and the mXn two-dimensional block frame 22-1 in the second frame having the closest correlation, that is, sb(1,1,2) is obtained. The moving distance in the horizontal and vertical directions at this time is assumed to be the motion vector 24 of the first frame, and is expressed as the horizontal motion vector mvh(1,1,2) showing the motion extent in the horizontal direction, and the vertical motion vector mvv(1,1,2) showing the motion extent in the vertical direction (where, in mvh(x,y,t), mvv(x,y,t), x: block coordinate in the horizontal direction in frame, $1 \leq x \leq M/m$, y: block coordinate in the vertical direction in frame, $1 \leq y \leq N/n$, t: frame index, $1 \leq t \leq T$). As for the third frame, on the basis of the mXn two-dimensional block 22-1 detected in the second frame, a similar motion vector 25 is obtained. In the embodiment descriptions hereinafter, for the sake of simplicity, the motion extent in the vertical direction mvv(x,y,t)=0 is supposed.

Incidentally, in the case of block coding such as orthogonal transform, as shown in the prior art, when three-dimensional blocks are composed as 71-1, 72-1, 73-1 as shown in FIG. 6(c), if such a motion as in FIG.

2 should be detected, it is 21-1, 22-1, and 23-1 that are actually operating, and hence the correlation in the time direction is lost and the compression efficiency is lowered. Therefore, in this embodiment, the three-dimensional blocks are composed along the motion vectors 24, 25 detected as shown in FIG. 1(b). That is, if the two-dimensional block of the first frame is sb(1,1,1), then the two-dimensional block of the second frame is sb(1,1,2) and the two-dimensional block of the third frame is sb(1,1,3)

Figure 2C:
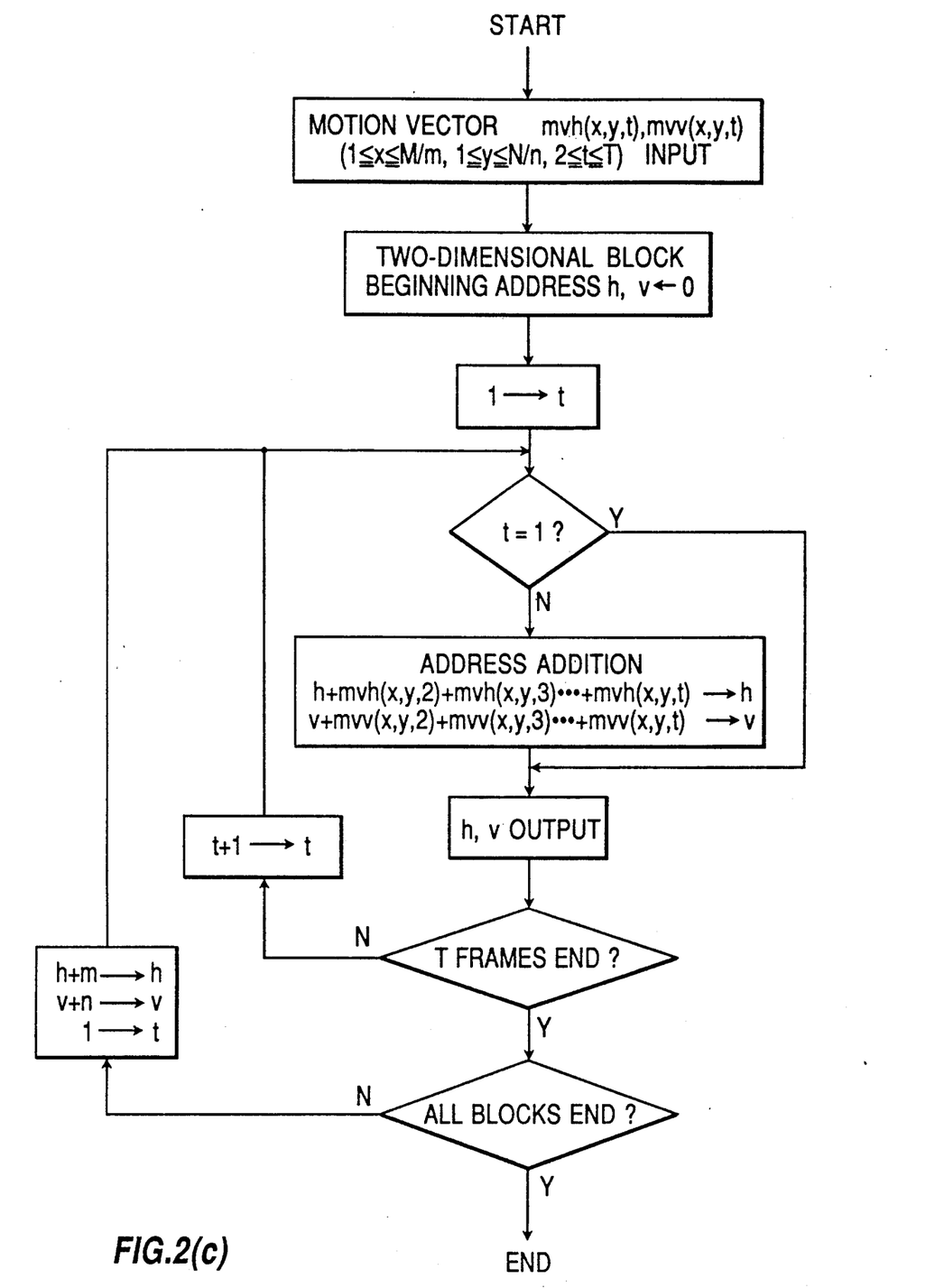

It is FIG. 2(c) that shows a flowchart of the CPU in the three-dimensional block composing method mentioned above. First, in the CPU, after feeding the motion vectors mvh(x,y,t), mvv(x,y,t), the two-dimensional block beginning address h,v, and the frame index t are initialized. In the first frame, since motion vector is not used, h,v are directly delivered. In the second and subsequent frames, the optimum motion vectors in each block mvhr(x,y,t), mvvr(x,y,t) are blocked as detected motion vectors mvh(x,y,t), mvv(x,y,t). Therefore, in the second frame, adding motion vectors mvh(x,y,2), mvv(x,y,2) to the beginning address h,v, h+mvh(x,y,2), v+mvv(x,y,2) are delivered to the address generation circuit. In the third frame, furthermore, adding motion vectors mvh(x,y,3), mvv(x,y,3) to the beginning address to obtain h+mvh(x,y,2)+mvh(x,y,3), v+mvv(x,y,2)+mvv(x,y,3). Thereafter, operating similarly up to the T-th frame, nXmXT three-dimensional blocks are formed. This operation is effected in all blocks within the screen.

This three-dimensional block is displayed on a system of three-dimensional coordinates in FIG. 1(a), and the three-dimensional block is composed of 11, 12, 13 in FIG. 1(a). The three-dimensional block composed in the technique as shown in FIG. 1, FIG. 2 is maintained in the correlation in the time direction, and therefore by block-coding the three-dimensional block, even a rapidly moving picture can be compressed and coded efficiently.

Incidentally, when the three-dimensional block is composed as shown in FIG. 1, a vacancy or overlapping of blocks in a reverse case may be formed at a location where the motion vectors differ, as shown between two-dimensional blocks 23-3 and 23-4 in FIG. 1(b). In the event of a vacancy, the image data is interpolated by any known interpolation technique, such as replacement with signal value of upper or lower line, holding of previous value, holding of succeeding value, mean interpolation, and interpolation using motion vector. Or overlap of blocks may be cleared by replacing with either block decoding value.

Figure 3A:
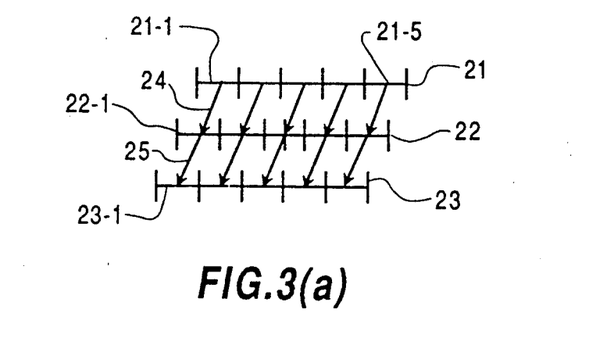
FIGS. 3a-3b are explanatory diagrams of picture coding method showing a second embodiment of the invention.
Figure 3B:
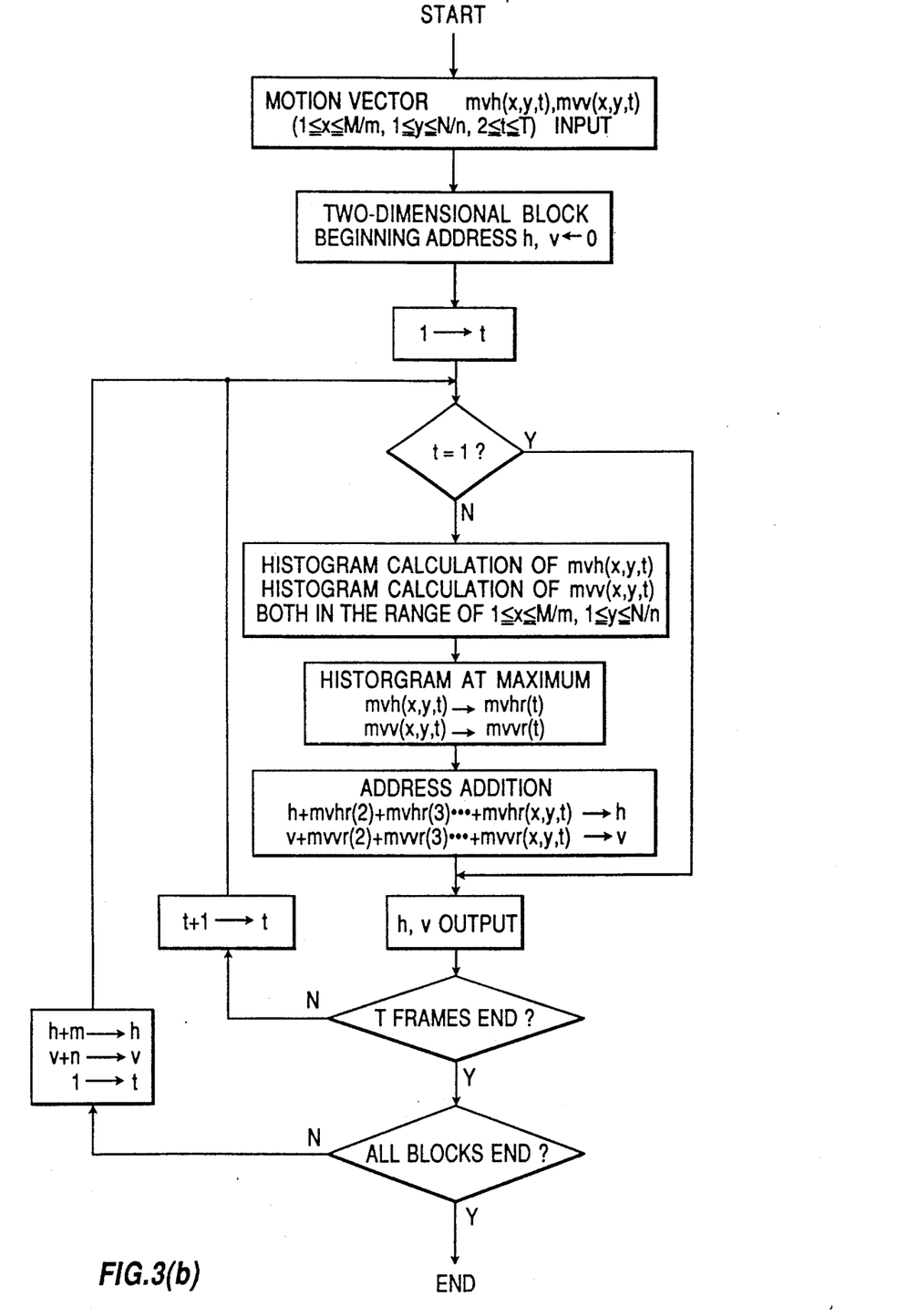

FIG. 3 is an explanatory diagram of picture coding method showing a second embodiment of the invention. FIG. 3(a), same as FIG. 1(b), is plotting of the data of each frame as two-dimensional plan view in the horizontal and time directions, in which numerals 21, 22, 23 are same as in the first embodiment. FIG. 3(b) is a CPU flowchart for realizing this embodiment.

In this embodiment, when the direction of the motion vector within same frame is equal by the number over a certain threshold value vth and the magnitude of motion vector is included within a certain range vwh, optimum vectors mvhr(t), mvvr(t)(where t is the frame index) are obtained by one each in the horizontal and vertical directions within the frame, where vth and vwh are experimentally determined.

Suppose the motion vector is obtained same as in FIG. 1(b), then, in FIG. 3(a), the motion vectors 26, 27 in FIG. 1(b) are replaced by the optimum motion 24, and 28, 29 by 25.

In the flowchart shown in FIG. 3(b), what is different from FIG. 2(c) is that the optimum motion vector is not directly replaced by the detected motion vector, but is calculated from the motion vector in the following techanique. First, a histogram of all blocks is plotted as for the magnitude of the motion vector mvh(x,y,t), mvv(x,y,t) in the frame. Next, in this histogram, the one having the highest frequency is determined as the optimum motion vector mvhr(t), mvvr(t). Or if the frequency distribution is uniform and it cannot be determined by the frequency alone, the optimum motion vector is determined as the mean excluding i pieces from the maximum value and j pieces from the minimum value, of the motion vectors of each block in the frame. This exclusion of i pieces and j pieces from the maximum and minimum respectively is intended to eliminate detecting errors in the motion detection, and the number of i and j should be experimentally determined by each detecting method. If there is no detecting error, i and j may be zero.

Consequently, on the basis of the optimum motion vector mvhr(t), mvvr(t), in the same operation as in the first embodiment, the beginning address of the two-dimensional block is generated, and two-dimensional blocks from the first to the T-th frame are sequentially read out from the frame memory, thereby composing a three-dimensional block including mXnXT picture elements.

Such manner of composing the three-dimensional block is optimum when the entire screen is panning. Besides, within the frame, all motion vectors are equal, there is no problem such as vacancy as experienced in FIG. 2.

FIG. 4 is an explanatory diagram of picture coding method showing a third embodiment of the invention. Same as FIG. 3(a), this is also a two-dimensional plan plotting of the frame data in the horizontal and time directions, in which numerals 21, 22 and 23 are meant same as in the first embodiment. FIG. 4(a) is a two-dimensional block diagram of the first frame, showing the result of motion detection by using this block as the reference, in which 22-1', 23-1' are the second and third frame two-dimensional blocks determined on the basis of the first frame two-dimensional block 21-1, 24, 31, and 33 are motion vectors between the first and second frames, and 25, 32 and 34 are motion vectors between the second and third frames.

Figure 4A:
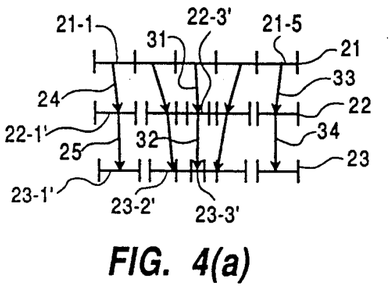
FIGS. 4a-4g are explanatory diagrams of picture coding method showing a third embodiment of the invention.
Figure 4B:
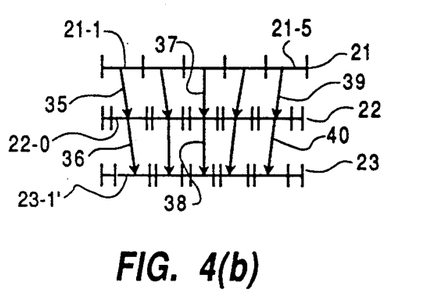
Figure 4C:
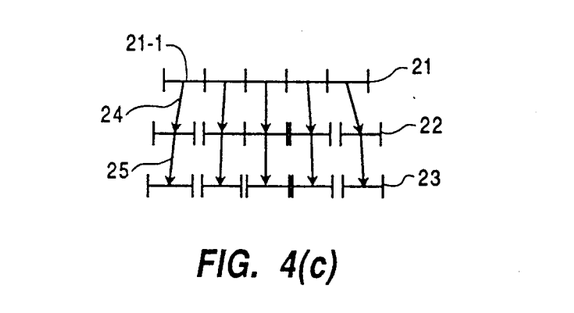
Figure 4D:
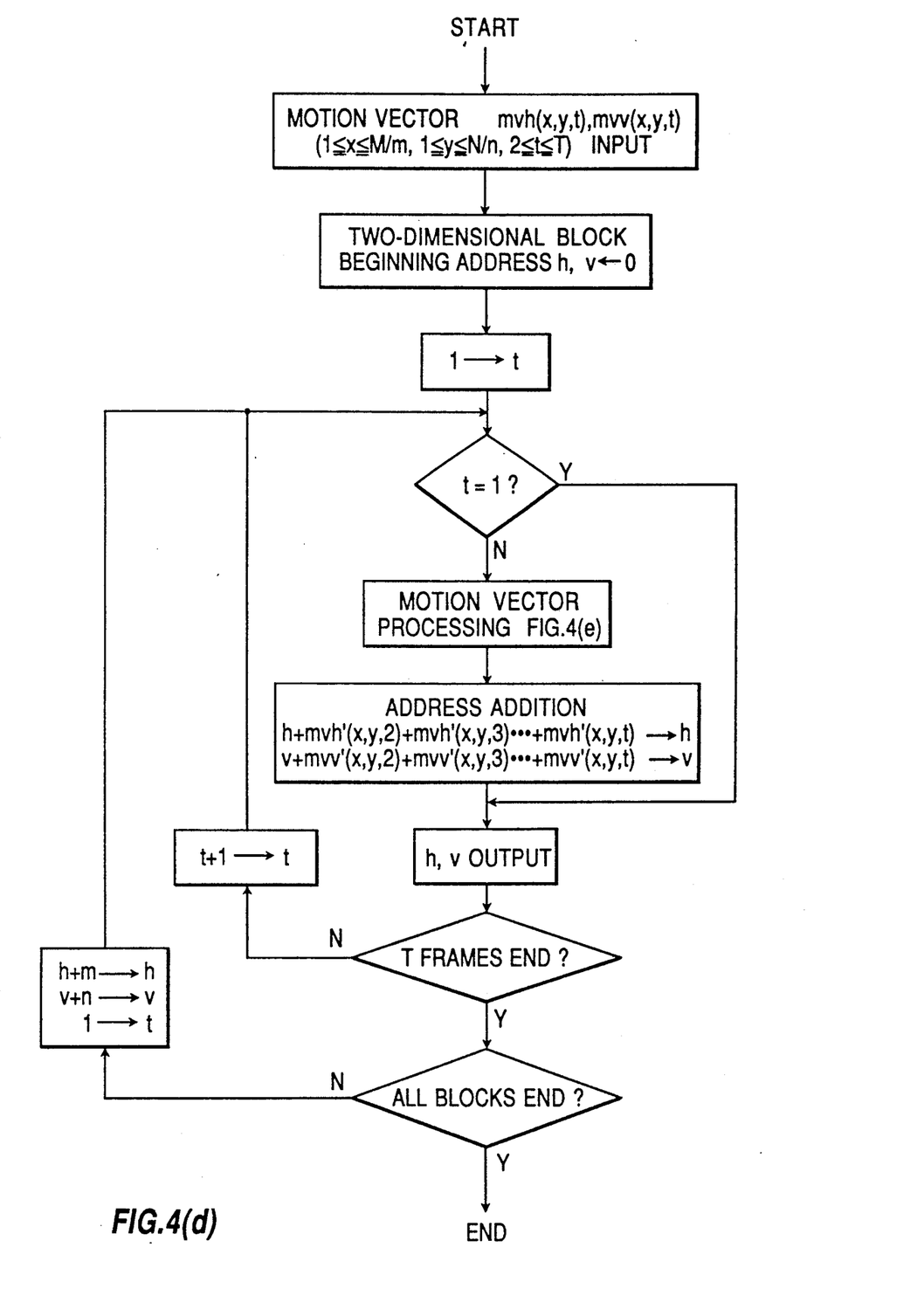

FIG. 4(b) is an explanatory diagram showing the method of composing a three-dimensional block by the motion vectors calculated again by employing the method shown in the embodiment below. FIG. 4(c) is an explanatory diagram showing the result of detection of motion vector different from FIG. 4(a). FIGS. 4(d), (e) are flowcharts of the CPU for realizing this embodiment. FIGS. 4(f), (g) are examples of the detected motion vector and the motion vector calculated again by the technique of this embodiment.

In the third embodiment, what is different from the second embodiment is the composing method of three-dimensional block. The motion vectors detected in the same manner as in the second embodiment are not mostly facing the same direction in the frame, but as shown in FIG. 4(a), as advancing to the second and third frames, the motion vectors are gradually centering around the two-dimensional blocks 22-3', 23-3'. In such case, since the directions of the motion vectors are different, optimum motion vectors cannot be uniformly determined in the frame as in the second embodiment. Or if determined uniformly and the three-dimensional block is composed by using such vectors, the correlation in the time direction cannot be enhanced. Incidentally, when the three-dimensional block is composed along the motion vectors shown in FIG. 4(a), the correlation in the time direction is heightened, but a vacancy or a portion incapable of coding is formed as shown in the diagram between the blocks 23-1' and 23-2'. Such motion vectors are determined at the time of zooming or the like.

Figure 4E:
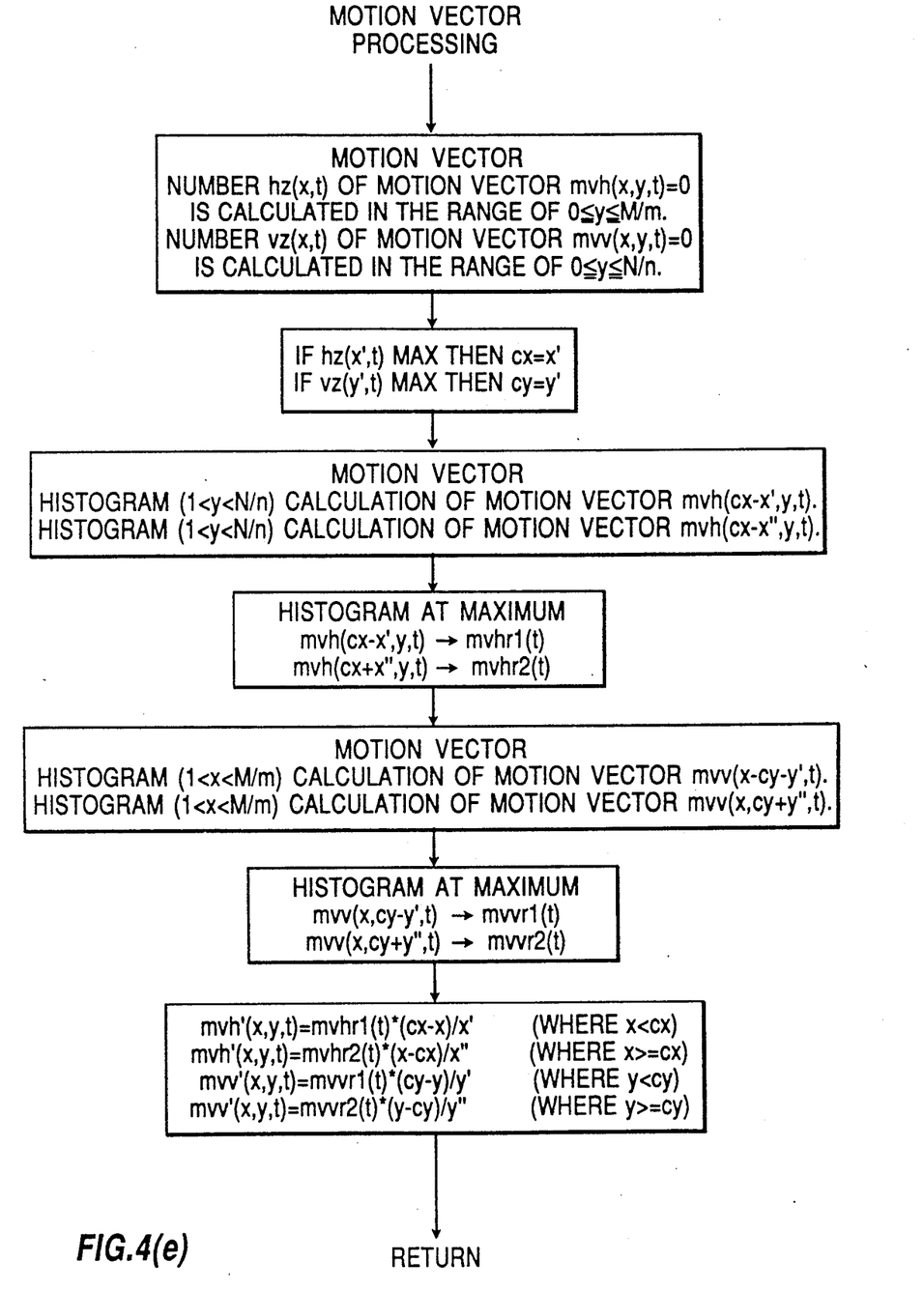
Figure 4F:
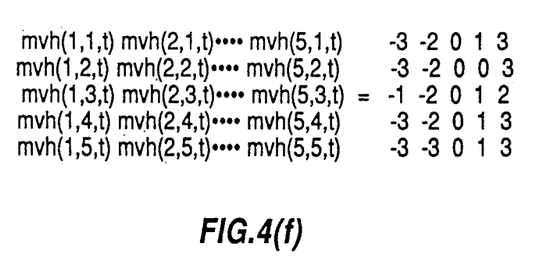

In this embodiment, accordingly, by treating the motion vectors as shown in FIG. 4(e), the optimum motion vectors are determined. In the first place, the central blocks 21-3, 22-3, 23-3 as the center of motion are determined as follows. The number hz(x,t) which is the motion vector mvh(x,y,t)=0 showing the motion extent in the horizontal direction is calculated in the relation of $0 \leq y \leq M/m$, and the block coordinate in the horizontal direction having the greatest number hz(x,t) is regarded as the block coordinate cx in the horizontal direction of the central block, and the number vz(y,t) which is the motion vector mvv(x,y,t)=0 showing the motion extent in the vertical direction is calculated in the relation of $0 \leq x \leq N/n$, and the block coordinate in the vertical direction having the greatest number vz(y,t) is regarded as the block coordinate cy in the vertical direction of the central block.

FIG. 4(f) is an example of detected horizontal motion vector. When the above method is applied to this example, we obtain cx=3 because (hz(1,t)hz(2,t)hz(3,t),hz(4,t), hz(5,t)=(0,0,5,1,0).

Or, in other method, of the motion vectors mvh(x,y,t) showing the motion extent in the horizontal direction, the number hcz(x,t) having zeros continuously is calculated in the frame t as for the block in the vertical direction, and the block coordinate cx in the horizontal direction having the greatest number hcz(x,t) is regarded as the block coordinate in the horizontal direction of the central block, and of the motion vectors mvv(x,y,t) showing the motion extent in the vertical direction, the number vcz(y,t) having zeros continuously is calculated in the frame t as for the block in the horizontal direction, and the block coordinate cy in the vertical direction having the greatest number vcz(y,t) is regarded as the block coordinate in the vertical direction of the central block.

In the latter method, the structure of the apparatus is somewhat complicated as compared with the former method, but if there is error detection of motion vector, it is effective since the vectors of the motion extent=0 determined by error detection can be eliminated.

Representative motion vectors 35, 36, 39, 40 in FIG. 4(b) are determined in the following method. Of the motion vectors in each frame, a histogram is plotted in a range of 1<y<N/n of the motion vectors mvh(cx-x',y,t), mvh(cx+x'',y,t) in a block apart from the central block by block coordinates x', x'' each, and the ones having the highest frequency in the histogram are supposed to be representative motion vectors mvhr1(t), mvhr2(t) in the horizontal direction, respectively, and of the motion vectors in each frame, a histogram is plotted in a range of 1<x<M/m of the motion vectors mvv(x,cy-y',t), mvh (x,cy+y'',t) in a block apart from the central block by block coordinates y',y'' each, and the ones having the highest frequency in the histogram are supposed to be representative motion vectors mvvr1(t), mvvr2(t) in the vertical direction, respectively.

Or, in other method, if there is no deviation in the frequency deviation and it cannot be determined by the frequency alone, the mean value excluding i pieces from the maximum value of the motion extent and j pieces from the minimum value is obtained as the representative motion vector. This exclusion of i pieces and j pieces from the maximum and minimum respectively is intended to eliminate the detection errors, and the number of i and j should be determined experimentally in each detecting method. If there is no detecting error, i and j may be zero.

Referring now to FIG. 4(f), a method of using histogram is explained below. In terms of x', x'', the end points of the screen are expressed as x'=x''=2. Since cx=3, individual histograms are calculated in a range of 1<y<5 of mvh(3-2,y,t), mvh(3+2,y,t). In the histogram, in mvh(1,y,t), -3 is found twice, -1 once, and in mvh(5,y,t), 3 twice and 2 once, and hence mvhr1(t)=-3, mvhr2(t)=3 are obtained. In FIG. 4(b), 35 is mvhr1(2), 39 is mvhr2(2), 36 is mvhr1(3), and 40 is mvhr2(3).

Employing thus obtained central block and representative motion vectors, the optimum motion vectors mvh'(x,y,t), mvv'(x,y,t) in the horizontal and vertical directions of each block are calculated as follows.

$$\text{mvh}'(x,y,t) = \text{mvhr1}(t) * (cx-x)/x' \text{ (where } x < cx) \tag{1}$$

$$\text{mvh}'(x,y,t) = \text{mvhr2}(t) * (x-cx)/x'' \text{ (where } x \geq cx) \tag{2}$$

$$\text{mvv}'(x,y,t) = \text{mvvr1}(t) * (cy-y)/y' \text{ (where } y < cy) \tag{3}$$

$$\text{mvv}'(x,y,t) = \text{mvvr2}(t) * (y-cy)/y'' \text{ (where } y \geq cy) \tag{4}$$

·where cx, cy are block coordinates of the central block, mvhr1(t), mvhr2(t), mvvr1(t), mvvr2(t) are representative motion vectors, x' is the block coordinate when obtaining the representative motion vector mvhr1(t), and hereinafter x'' corresponds to mvhr2(t), y' to mvvr1(t), and y'' to mvvr2(t).

Figure 4G:
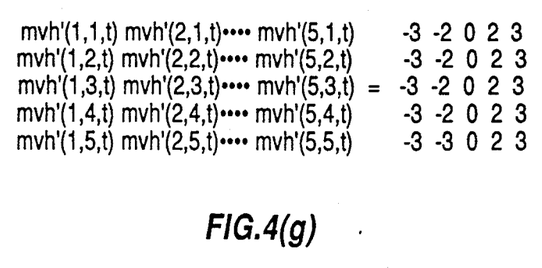

It is FIG. 4(g) that shows an example of calculation of mvht'(x,y,t) by applying thus obtained cx=3, x'=x''=2, mvhr1(t)=-3, mvhr1(t)=3 to the example in FIG. 4(f).

Otherwise the following equations may be also employed.

$$\text{mvh}'(x,y,t) = \text{mvhr1}(t) * (cx-x)^2/x'^2 \text{ (where } x < cx) \tag{5}$$

$$\text{mvh}'(x,y,t) = \text{mvhr2}(t) * (x-cx)^2/x''^2 \text{ (where } x \geq cx) \tag{6}$$

$$\text{mvv}'(x,y,t) = \text{mvvr1}(t) * (cy-y)^2/y'^2 \text{ (where } y < cy) \tag{7}$$

$$\text{mvv}'(x,y,t) = \text{mvvr2}(t) * (y-cy)^2/y''^2 \text{ (where } y \geq cy) \tag{8}$$

whether equations (1) to (4) or equations (5) to (8) should be used may be determined in consideration of the compression efficiency in application to pictures.

Next, according to the optimum motion vectors mvh'(x,y,t), mvv'(x,y,t), in the same operation as in the first and second embodiments, the beginning address of the two-dimensional block is generated, and the two-dimensional blocks from the first to the T-th frame are sequentially read out from the frame memory, and a three-dimensional block comprising mXnXT picture elements is composed. In the following technique, as shown in FIG. 4(b), it is possible to compose a three-dimensional block maintaining the correlation in the time direction, having no vacancy among blocks. Therefore, by block-coding of the three-dimensional block, a high compression efficiency is realized.

In the third embodiment, meanwhile, when the picture zooms up, for example, the motion vector as shown in FIG. 4(c) is detected. When such vector is detected, the motion vector is detected again in the time direction on the basis of the latest frame. In other words, supposing the reference frame to be the T-th frame, the motion is detected in the sequency of frame T−1, . . . , 3, 2, 1. As a result, the motion vector as shown in FIG. 4(c) becomes a same motion vector as shown in FIG. 4(a), equivalently. Therefore, in the same manner as in the third embodiment, an effective compression is realized.

FIG. 5 is an explanatory diagram of a picture coding method showing a fourth embodiment of the invention. FIG. 5, same as FIG. 3 and FIG. 4, is a two-dimensional plan plotting of the image data of each frame in the horizontal and time directions, in which numerals 21, 22, 23 are same as in the third embodiment. Same as in FIG. 4, in FIG. 5, too, the horizontal direction of the picture data of one frame is composed of five blocks, and 21-1, 21-5 denote the blocks at the end of the picture data of the first frame, 22-1, 22-5 those of the second frame, and 23-5 of the third frame.

Figure 5A:
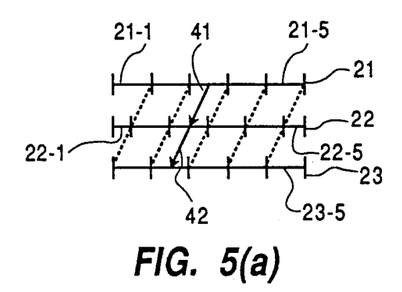
FIGS. 5a-5f are explanatory diagrams of picture coding method showing a fourth embodiment of the invention.

Supposing to perform three-dimensional blocking, as shown in the second embodiment, in each frame by using the optimum motion vectors of 41, 42, FIG. 5(a) is a diagram showing the blocking result, in which 21-2 to 21-5 are normally blocked, but 21-1, 22-1 lack image data in the third frame and cannot be blocked. Meanwhile, 22-5, 23-5, having no reference two-dimensional block in the first frame, cannot be blocked, and these pieces of image data cannot be coded in this state, and will be lost.

Figure 5B:
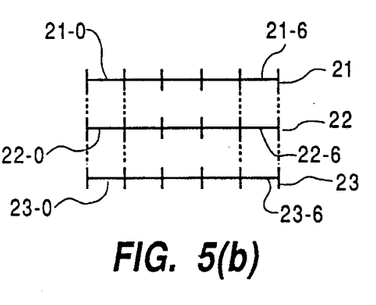

Incidentally, in this embodiment, as shown in FIG. 5(b) as 21-0 and 21-6, three-dimensional blocks conforming to the conventional method without using optimum motion vectors are composed, and are coded separately from the three-dimensional block shown in the second embodiment, and transmitted. At this time, 21-0, 21-6 are equivalent to 21-1, 21-5, respectively, in the first frame. By this method, the end points of the screen may be also coded.

Figure 5C:
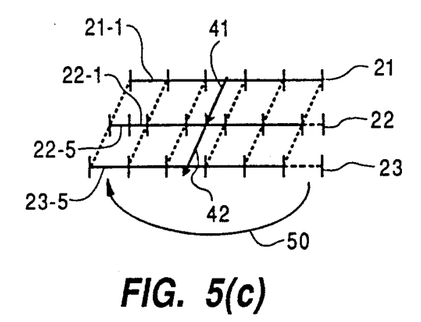

FIG. 5(c) is an explanatory diagram for compensating the second, that is, insufficient picture elements for coding the end points, by holding the picture elements in the same frame. In the diagram, as indicated by arrow 50, 22-5 and 23-5 are shifted to the other end of the frame, thata is, 22-5 is adjacent to 22-1 and 23-5 to 23-1. Next, by blocking 21-1 by using motion vectors, 41, 42, a three-dimensional block is composed. And then block coding is carried out. When decoding, in the reverse procedure, 22-5 and 23-5 are returned to the original positions to obtain decoded images. In this method, since it is not necessary to send the end points of screen separately, it is possible to code by using a smaller quantity of data as compared with the first method.

Figure 5D:
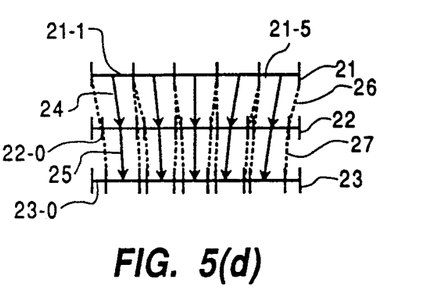

FIGS. 5(d), (e), (f) are explanatory diagrams of the method of compensating the third, that is, insufficient picture elements for coding the end points of the screen by holding of picture elements of other frames. Supposing, here, to compose a three-dimensional block by using the method shown in the second embodiment as in FIG. 5(d), in which the dotted line shows the block boundary, each block is composed along the motion vectors indicated by thick lines in the diagram. In FIG. 5(d), same as in FIG. 5(b), regions incapable of coding are present in screen end points 22-0, 23-0, 22-6, 22-7. This is because the three-dimensional block is mutually overlapped after the second frame.

Figure 5E:
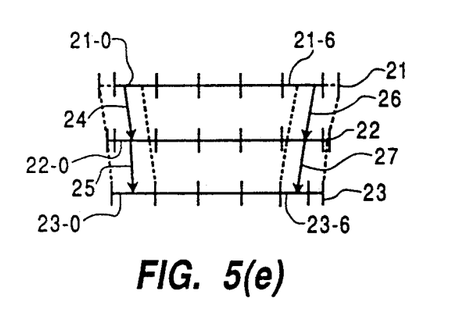
Figure 5F:
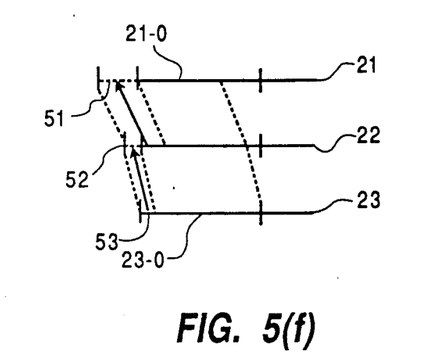

Accordingly, in FIG. 5(e), of the motion vectors detected as in FIG. 5(d), new blocks 21-0, 21-6 are composed by using the motion vectors, 24, 25, 26, and 27 determined on the basis of the blocks 21-1, 21-5 including the end points of the image of the first frame. The reference frame at this time is the frame reverse to FIG. 5(c) timewise, that is, 23. FIG. 5(e) is an example of composing one three-dimensional block with three frames. In this case, the reference two-dimensional blocks are third frame 23-0, 23-6. This is because the number of uncoded picture elements is most in the third frame 23. Next, using motion vectors 24 to 27, a three-dimensional block is composed. FIG. 5(f) is an explanatory diagram showing the detail of the composition of the three-dimensional block shown in FIG. 5(e). In the diagram, 21 to 23, 21-0, 23-0 are same as in FIG. 5(e), and the blocks corresponding to 21-0 to 23-0 in FIG. 5(e) are magnified. Now, on the basis of the two-dimensional block 23-0 including the end points of the third frame, using the motion vectors 25, 24 in FIG. 5(e), a three-dimensional block is composed, but in the second frame and first frame, there is no image data of the portion corresponding to 51, 52, respectively. Accordingly, 52 is replenished with part of 23-0 indicated by 53, and 51 with part of 52 and 22-0, as indicated by arrows, thereby composing a three-dimensional block, and this three-dimensional block is block-coded as a new block. In this way, the correlation in the time direction is maintained within the block, and therefore as compared with the method shown in FIG. 5(a), (b), it is possible to code the end point block of the picture at high compression rate and high picture quality.

In the fourth embodiment, meanwhile, the first and second methods were explained by combining with the second embodiment, and the third method in combination with the third embodiment, but these are not limitative.

Incidentally, in the foregoing embodiments, all motions in the vertical direction were supposed to be zero, but this is not limitative, and exactly the same method in the horizontal method may be applied also to the vertical direction.

As examples of block coding, in the embodiments, orthogonal transform was explained, but this is not limitative, and the invention may be equally applied to any coding method by dividing into blocks, such as vector quantizing, and DPCM in block units.

What is claimed is:

1. A picture coding method comprising the steps of:
   dividing the input T-frame picture data s(h,v,t) (here
     h: picture element index in the horizontal direction, $1 \leq h \leq M$, v: picture element index in the vertical direction, $1 \leq v \leq N$, t: picture element index in the time direction, $1 \leq t \leq T$) into two-dimensional blocks sb(x,y,1) (where x: block coordinate in the horizontal direction in frame, $1 \leq x \leq M/m$, y: block coordinate in the vertical direction in frame, $1 \leq y \leq N/n$) of m(horizontal direction) X n(vertical direction) picture elements each in the first frame, that is, s(h,v,1),
   obtaining the two-dimensional blocks sb(x,y,2) in the size of mXn most closely correlated with said sb(x,y,1) on the second frame s(h,v,2), and simultaneously determining the horizontal motion vector mvh(x,y,2) showing the motion quantity in the horizontal direction of said sb(x,y,2) on the basis of said sb(x,y,1) and the vertical motion vector mvv(x,y,2) showing the motion quantity in the vertical direction, calculating again the optimum motion vectors mvhr(x,y,2), mvvr(x,y,2) from the motion vectors mvh(x,y,2), mvv(x,y,2) of each block in the frame with respect to each block, adding the motion quantities mvhr(x,y,2), mvvr(x,y,2) of said motion vectors to obtain s(h+mvht(t), v+mvvt(t),t) and cutting out the two-dimensional block composed of mXn picture elements on the second frame to obtain sb'(x,y,2), determining the two-dimensional block sb(x,y,3) and motion vectors mvh(x,y,3), mvv(x,y,3) in the size of mXn most closely correlated with said sb'(x,y,2) on the third frame s(h,v,3), calculating again, in each block, the optimum motion vectors mvhr(x,y,3), mvvr(x,y,3) from the motion vectors mvh(x,y,3), mvv(x,y,3) of each block in the frame, from the motion quantity between the two-dimensional blocks sb'(x,y,2) and sb(x,y,3) obtained above, adding mvhr(x,y,3), mvvr(x,y,3) to the motion quantity of said motion vectors to obtain s(h-mvht(t), v-mvvt(t),t), and cutting out a two-dimensional block composed of mXn picture elements on the third frame to obtain sb'(x,y,3), Operating thereafter similarly up to the T-th frame s(h,v,T) to obtain a two-dimensional block sb'(x,y,t) in each frame, composing a three-dimensional block of said two-dimensional blocks sb(x,y,1), sb'(x,y,2) to sb'(x,y,T) among said T frames, and block-coding at least part of said three-dimensional block.

2. A picture coding method of claim 1, wherein said detected motion vectors mvh(x,y',t), mvv(x,y,t) are used as said optimum motion vectors mvhr(x,y,t), mvvr(x,y,t).

3. A picture coding method of claim 1, wherein said optimum motion vectors mvhr(x,y,t), mvvr(x,y,t) are provided by one type in each frame.

4. A picture coding method of claim 3, wherein said optimum motion vectors mvhr(t), mvvr(t) are plotted in histograms of motion vectors mvh(x,y,t), mvv(x,y,t) of each block in the frame, and the one of the highest frequency is selected in the histogram.

5. A picture coding method of claim 3, wherein said optimum motion vectors mvhr(t), mvvr(t) are obtained as the mean by excluding i pieces from the maximum value, and j pieces from the minimum value, of the motion vectors mvh(x,y,t), mvv(x,y,t) of each block in the frame.

6. A picture coding method of claim 1, wherein the central block as the center of motion, representative horizontal motion vectors with different signs mvhr1(t), mvhr2(t), and representative vertical motion vectors with different signs mvvr1(t), mvvr2(t) are obtained from the motion vectors mvh(x,y,t), mvv(x,y,t) of each block, and optimum motion vectors mvhr(x,y,t), mvvr(x,y,t) are calculated and obtained from the central block and the representative motion vectors, mvhr1(t), mvhr2(t), mvvr1(t), mvvr2(t).

7. A picture coding method of claim 6, wherein the number hz(x,t) of which motion vector mvh(x,y,t) showing the motion extent in the horizontal direction is 0 is calculated in frame t as for the block in the vertical direction, and the block coordinate in the horizontal direction having the greatest number hz(x,t) is regarded as the block coordinate cx in the horizontal direction of the central block, and the number vz(y,t) of which motion vector mvv(x,y,t) showing the motion extent in the vertical direction is 0 is calculated in the frame t as for the block in the horizontal direction, and the block coordinate in the vertical direction having the greatest number vz(y,t) is regarded as the block coordinate cy in the vertical direction of the central block.

8. A picture coding method of claim 6, wherein the number hcz(x,t) with consecutive zeros out of the motion vector mvh(x,y,t) showing the motion extent in the horizontal direction is calculated within the frame t as for the block in the vertical direction, and the block coordinate in the horizontal direction having the greatest number hcz(x,t) is regarded as the block coordinate ex in the horizontal direction of the central block, and the number vcz(y,t) with consecutive zeros out of the motion vector mvv(x,y,t) showing the motion extent in the vertical direction is calculated within the frame t as for the block in the vertical direction, and the block coordinate in the vertical direction having the greatest number vcz(y,t) is regarded as the block coordinate cy in the vertical direction of the central block.

9. A picture coding method of claim 6, wherein the representative horizontal motion vectors mvhr1(t), mvhr2(t) are plotted in a histogram in a range of $1<y<N/n$ of motion vectors $mvh(cx-x',y,t)$, $mvh(cx+x'',y,t)$ of the block apart from the central block by block coordinates x', x'', and are the ones of the highest frequency in the histogram, and the representative vertical motion vectors mvvr1(t), mvvr2(t) are plotted in a histogram in a range of $1<x<M/m$ of motion vectors $mvv(x,cy-y',t)$, $mvh(x,cy+y'',t)$ of the block apart from the central block by block coordinates y', y'', and are the ones of the highest frequency in the histogram.

10. A picture coding method of claim 6, wherein the representative horizontal motion vectors mvhr1(t), mvhr2(t) are the mean values excluding i pieces from the maximum value of the motion extent and j pieces from the minimum value, of the motion vectors $mvh(cx-x',y,t)$, $mvh(cx+x'',y,t)$ of the block apart from the central block by block coordinates x', x'', and the representative vertical motion vectors mvvr1(t), mvvr2(t) are the mean values excluding i pieces from the maximum value of the motion extent and j pieces from the maximum value, of the motion vectors $mvv(x,cy-y',t)$, $mvh(x,cy+y'',t)$ of the block apart from the central block by block coordinates y', y''.

11. A picture coding method of claim 6, wherein the optimum motion vectors mvh'(x,y,t), mvv'(x,y,t) are generated by calculating as follows:

$$mvh'(x,y,t) = mvhr1(t)*(cx-x)/x' \text{ *where } x<cx,$$

$$mvh'(x,y,t) = mvhr2(t)*(x-cx)/x'' \text{ *where } x>=cx,$$

$$mvv'(x,y,t) = mvvr1(t)*(cy-y)/y' \text{ *where } y<cy,$$

$$mvv'(x,y,t) = mvvr2(t)*(y-cy)/y'' \text{ *where } y>=cy,$$

in terms of the block coordinates cx, cy of the central block, representative motion vectors mvhr1(t), mvhr2(t), mvvr1(t), mvvr2(t), block coordinate x' when obtaining the representative motion vector mvhr1(t), x" for mvhr2(t), y' for mvvr1(t), and y" for mvvr2(t).

12. A picture coding method of claim 6, wherein the optimum motion vectors mvh'(x,y,t), mvv'(x,y,t) are generated by calculating as follows:

$$mvh'(x,y,t) = mvhr1(t)*(cx-x)^2/x'^2 \text{ (where } x<cx),$$

$$mvh'(x,y,t) = mvhr2(t)*(x-cx)^2/x''^2 \text{ (where } x>=cx),$$

$$mvv'(x,y,t) = mvvr1(t)*(cy-y)^2/y'^2 \text{ (where } y>cy),$$

$$mvv'(x,y,t) = mvvr2(t)*(y-cy)^2/y''^2 \text{ (where } y>=cy),$$

in terms of said cx, cy, mvr1(t), mvhr2(t), mvvr1(t), mvvr2(t), x', x", y' and y".

13. A picture coding method of any one of claims 1, 2, 3, 6, wherein said motion vector is determined by assuming the frame to be used as the reference of motion vector to be the T-th frame image data s(h,v,T), detecting against the adjacent T-1 frame image data s(h,v,T-1), determining the two-dimensional block of the size of mXn having the closest correlation, and thereafter similarly detecting the motion up to the first frame s(h,v,1).

14. A picture coding method of any one of claims 1, 2, 3, 6, wherein the block containing the end points in the horizontal or vertical direction, out of the three-dimensional blocks, is formed as three-dimensional block having the motion vector as zero among consecutive T frames, and block-coding the three-dimensional block.

15. A picture coding method of any one of claims 1, 2, 3, 6, wherein if there is no image data in the three-dimensional block and it is impossible to form block, insufficient picture elements are compensated by holding picture elements within the same frame to compose a three-dimensional block, and this three-dimensional block is block-coded.

16. A picture coding method of any one of claims 1, 2, 3, 6, wherein if there is no image data in the three-dimensional block and it is impossible to form block, insufficient picture elements are compensated by holding picture elements in a different frame to compose a three-dimensional block, and this three-dimensional block is block-coded.

* * * * *